United States Patent [19]

Chen et al.

[11] 4,113,504

[45] Sep. 12, 1978

[54] DISPOSAL OF HEAVY METAL CONTAINING SLUDGE WASTES

[75] Inventors: Kon S. Chen, Norwalk, Conn.; Helmut W. Majewski, Nyack, N.Y.

[73] Assignee: Stauffer Chemical Company, Westport, Conn.

[21] Appl. No.: 838,510

[22] Filed: Oct. 3, 1977

[51] Int. Cl.$^2$ ............................................... C04B 7/02
[52] U.S. Cl. ................................. 106/97; 106/DIG. 3
[58] Field of Search .................... 106/315, DIG. 3, 97

[56] References Cited

U.S. PATENT DOCUMENTS

| 2,542,992 | 2/1951 | Clapper | 106/DIG. 3 |
| 3,947,283 | 3/1976 | Uchikawa et al. | 106/315 |
| 3,947,284 | 3/1976 | Kitsugi et al. | 106/315 |

*Primary Examiner*—J. Poer
*Attorney, Agent, or Firm*—Roger S. Benjamin

[57] ABSTRACT

The heavy metal content of sludge waste is fixed in a cementitious solid product by mixing the waste sludge with fixing ingredients comprising vermiculite and cement.

7 Claims, No Drawings

DISPOSAL OF HEAVY METAL CONTAINING SLUDGE WASTES

BACKGROUND OF THE INVENTION

The release of heavy metals such as arsenic and mercury into the environment is a significant industrial problem. Natural weathering processes aided by rainfall often permit transport of the heavy metal content of wastes far beyond the original area of disposal.

It has been proposed to contain wastes by combining them with materials which increase their stability and resistance to natural degradation.

U.S. Pat. No. 3,841,102 (issued Oct. 15, 1974 to Cinner, J. R., et al.) describes the treatment of waste materials with a mixture of soluble silicates and cement to prepare a stable earth-like material with entrapped pollutants.

U.S. Pat. No. 3,947,284 (issued Mar. 30, 1976 to Kitsugi, K., et al.) describes a mixture of Portland cement and gypsum useful for admixture with sludges to provide solidified cements.

U.S. Pat. No. 3,720,609 (issued Mar. 13, 1973 to Smith, C. L., et al.) describes the treatment of waste sludges with aluminum, calcium, and sulfate ions to yield a hardened composition suitable for disposal in the environment.

A report entitled "Preliminary Report of the Development of a Method for the Solidification of Process Concentrates from the Radioactive Waste Treatment at Pelindaba" by R. A. Barbour, R. F. Henwood, and H. B. Dieperink (U.S. At. Comm. Pel-102, December 1965; abstracted at Chem. Abs., 67:47016h) describes a vermiculite/cement mixture held in vacuo in a steel drum fitted with an inlet pipe. Low solids alkaline aqueous wastes containing radioactive sodium are drawn into the drum. The vermiculite acts as a filtration medium and is stated to increase the wetting properties of the cement and assist in the distribution of liquid waste in the drum.

The above-described methods do not fully answer the practical requirements of large scale industrial waste disposal of heavy metal containing waste. A practical disposal method must employ readily available materials and use inexpensive processing techniques with conventional apparatus.

THE INVENTION

This invention is a method of treating heavy metal containing sludge waste to produce a cementitious solid product having reduced heavy metal content leachability. The heavy metal content of the waste is effectively fixed to restrict release into the environment. The solid product is produced by mixing sludge waste with fixing ingredients comprising vermiculite and cement. Upon setting, the product may be disposed of as landfill.

DETAILED DESCRIPTION OF THE INVENTION

Waste benefitting from treatment according to the method of this invention is high solids content sludge containing accumulated heavy metal content. The physical appearance of the sludge is generally a slurry, paste, or wet cake containing both a liquid phase and a solid phase. The liquid phase is substantially water held as free water which is mechanically separable from the remainder of the sludge solids (e.g., separable by filtration, decantation, or centrifugation).

Sludge wastes suitable for treatment are of high solids content, specifically above 15 weight percent and preferably from about 40 to about 70 weight percent solids. The aqueous liquid phase may contain dissolved solids and constitutes less than 85 and more typically between about 60 to about 30 weight percent of the total weight of sludge waste.

The heavy metal content of sludge wastes is usually less than one weight percent based on the weight of sludge solids. More often, the heavy metal content will be in the range of 10 to 1000 parts per million by weight. Metals of Groups IB, IIB, IVB, VB, VIB, VIIB, VIII, IIIA, IVA, VA, the Lanthanides, and the Actinides (based on Periodic Table of the Elements, *Handbook of Chemistry and Physics*, 46th Edition 1965–1966, Page B-3, publ., Chemical Rubber Co., Cleveland, Ohio) may constitute the heavy metal content of the sludge.

Both the liquid and solid phases of the sludge waste may contain heavy metal although generally the solid phase contains the predominant portion.

In particular, it is desirable to remove heavy metals with undesirable toxicologic properties such as arsenic, selenium, cadmium, mercury, bismuth, thorium, uranium, plutonium, or mixtures thereof. The heavy metal contained in the sludge may be any compound, complex, or elemental form of the heavy metal.

Two specific examples of sludge wastes containing heavy metal content are (1) mercury containing sludge from mercury cathode brine electrolysis cell operation, and (2) arsenic containing sludge from the combustion of elemental phosphorus to form phosphoric acid. The mercury cell sludge contains typically 50 to 2000 parts per million mercury. The phosphorus sludge may contain as much as 5000 ppm arsenic.

The essential ingredients necessary to fix the heavy metal content of the sludge are vermiculite and cement. The ratio of vermiculite to cement is not critical but it is typical practice to use a vermiculite to cement weight ratio in the range from 5:1 to 1:5. The vermiculite ingredient is particulate exfoliated magnesium silicate with a density as low as 0.09. Industrial grades of vermiculite having average sizes in the range of about 0.25 mm. to about 10 mm. diameters are suitable.

The cement ingredient is any particulate inorganic material containing calcareous, siliceous, and argillaceous components which forms a plastic mass upon mixing with the proper proportion of water. The plastic mass sets (solidifies) by a complex mechanism of chemical combination, gelation, and crystallization over a period of hours or days. Examples of suitable cements are natural cement, alumina cement, and Portland cement. In particular, it is desirable to use Portland cement such as ASTM Types I, II, III, IV, or V.

The essential ingredients may also be combined with optional ingredients such as sand, gravel, gypsum, lime, clays, or plastics to provide desired properties. Generally, such optional ingredients should be present in a ratio of less than one part by weight per one part by weight of cement fixing ingredient.

The leachability of heavy metals in the sludge waste is reduced by fixing both the liquid and solid phases of the sludge in the solid cementitious matrix of vermiculite and cement. Since acidic substances are generally deleterious to the stability of cement, it is recommended that basic substances be added to neutralize acidic sludges to give a mixture of sludge and fixing ingredients which has a pH of at least 7 and preferably above pH 8. Examples of useful basic materials are oxides, hydroxides, and carbonates of magnesium and calcium (e.g., limestone).

Sludge waste usually contains sufficient free water in its liquid phase to combine with the cement ingredient and form a neat cement paste capable of setting to a solid cementitious product. The effective proportions of sludge and fixing ingredients may be adequately determined by the visual appearance of the mixture resulting from mechanically blending sludge waste, cement, vermiculite, and any desired optional ingredients. The desired appearance of the mixture is a neat cement paste of uniform consistency absent a separate liquid phase. The quantity of sludge waste which may effectively be combined with the cement and vermiculite is conveniently estimated from the ratio of liquid sludge phase to the quantity of cement ingredient.

Generally, sludge waste is mixed with cement ingredient in proportion such that the weight ratio of aqueous liquid phase of the sludge to the cement ingredient is in the range from 10:1 to 1:3.

Sludge waste of low (e.g., less than 30 weight percent) aqueous liquid phase content may also be treated by the process of this invention by either initially adding water to the sludge or adding water to the fixing ingredients.

The sludge waste and the essential ingredients of the fixing composition may be combined in any order. For example, vermiculite may be mixed with the sludge and the resulting mixture combined with cement. In most instances, it will be practical to add the vermiculite to the sludge to adsorb excess liquid phase then add the cement ingredient.

Time and temperature conditions for operation of the process are not critical. Depending on the particular characteristics of the cement ingredient, the mixture will typically set in a period of from one hour to several days at ambient temperatures. It is not necessary that the solid product possess compressive strength or dimensional stability typical of cement for structural use. More often, the product of this invention will be a crushable solid product, which is easily handled.

Disposal of the product may take the form of surface landfill or underground burial without special precautions. A distinguishing feature of the solid cementitious product of this invention is that natural erosive weathering forces such as rainfall, leach the heavy metal content of the sludge fixed in the product at a greatly reduced rate compared to leaching of the original sludge material.

The apparatus necessary for performance of the described process is limited to conventional pumps and mixing apparatus.

Various aspects of the invention are illustrated in the examples set out below, but it is not intended that the scope of the invention is limited to such specific practices.

EXAMPLES

PART A

Test Procedure

Sludge waste was loaded into a vertical 40 by 600 mm. chromatographic column containing a sintered glass frit support. The column was charged with sludge waste sample. One hundred ml. aliquots of distilled water were sequentially added to the column. The flow rate through the column was adjusted to 1 ml. per minute by restricting outflow at the bottom of the column. The leachate was collected, and selected samples were submitted for analysis.

All proportions recited are weight proportions. 800 ml. of water were estimated equivalent to 25 inches of rainfall.

PART B

Leaching of Mercury Containing Sludge (Untreated)

Sludge waste containing mercury was obtained from a settling pond receiving waste from mercury cathode brine electrolysis cell operation. The sludge contained 55 percent water and had a total initial mercury content of 300 parts per million. One hundred grams of the mercury sludge were tested by the procedure of Part A. Test results are as follows:

| Leach Sequence | MERCURY CONCENTRATIONS IN SLUDGE LEACHATE FRACTIONS | |
|---|---|---|
| | Leach Portion Volume (ml.) | Mercury Content (ppm) of Leach Portion |
| 1 | 100 | 2.7 |
| 2 | 100 | 1.1 |
| 3 | 100 | 0.6 |
| 4 | 100 | 0.5 |
| 5 | 100 | 0.3 |
| 6 | 100 | 0.4 |
| 7 | 100 | 0.3 |
| 8 | 100 | 0.8 |
| Etc. | After 1000 | 0.31 |
| Etc. | After 2000 | 0.24 |
| Etc. | After 3000 | 0.093 |
| Etc. | After 4000 | 0.050 |
| Etc. | After 8000 | 0.039 |

PART C

Fixation of Mercury in Sludge Waste

The mercury containing sludge of Part B was used in this experiment.

Two hundred grams of sludge were mixed with 5 grams of vermiculite and 20 grams of Portland cement. Mixing was continued until a uniform paste absent a free liquid phase was obtained. The mixture was placed in a glass jar and allowed to set for 3 days. The resultant solid product was sampled by digging into the mass with a spatula. One hundred grams were tested by leaching according to the procedure set out in Part A. Tests results are shown below:

| Leach Sequence | Leach Portion Volume (ml.) | Mercury Content (ppm) of Leach Portion |
|---|---|---|
| 1 | 200 | 0.004 |
| 2 | 200 | 0.003 |
| 3 | 200 | 0.006 |
| 4 | 200 | 0.0006 |

PART D

Fixation of Mercury in Sludge Waste

The mercury containing sludge of Part B was used in this experiment.

This Example part illustrates the long term leaching of a fixed sludge composition similar to the product prepared in Part C.

Two hundred grams of sludge were mixed with 5 grams of vermiculite and 20 grams of Portland cement. Mixing was continued until a uniform paste absent a free liquid phase was obtained. The mixture was placed in a glass jar and allowed to set for 3 days. The resultant solid product was sampled by digging into the mass with a spatula. One hundred grams were tested by leaching according to the procedure set out in Part A except that 200 ml. aliquots of distilled water were used for the leaching test. An abbreviated Table of test results is shown below:

| Leach Sequence | Leach Portion Volume (ml.) | Mercury Content (ppm) of Leach Portion |
|---|---|---|
| 1 | 200 | 0.0084 |
| 4 | 200 | 0.002 |
| 29 | 200 | 0.003 |
| 44 | 200 | 0.001 |
| 55 | 200 | 0.002 |

PART E

Leaching of Untreated Arsenic Containing Sludge

The method and apparatus of Part A were employed in this experiment. The sludge waste was an acidic material resulting from thermal process phosphoric acid manufacture. The sludge contained 40 weight percent solids with 1500 ppm and 500 ppm respectively of arsenic in the solid and liquid phases. The predominant part of the arsenic was present as arsenic sulfide.

One hundred grams of the sludge were subjected to sequential leaching. The results of the leaching are as follows:

| ARSENIC CONCENTRATION IN SLUDGE LEACHATE FRACTIONS | | |
|---|---|---|
| Leach Sequence | Leach Portion Volume (ml.) | Arsenic Content (ppm) of Leach Portion |
| 1 | 100 | 444 |
| 2 | 100 | 84.5 |
| 3 | 100 | 58.3 |
| 4 | 100 | 39.4 |
| 5 | 100 | 28.0 |
| 6 | 100 | 33.6 |
| 7 | 100 | 30.8 |
| 8 | 100 | 38.8 |
| Etc. | After 1000 | 6.8 |
| Etc. | After 2000 | 17 |
| Etc. | After 3000 | 5.2 |
| Etc. | After 4000 | 5.2 |
| Etc. | After 5000 | 10.2 |
| Etc. | After 6000 | 2.2 |
| Etc. | After 7000 | 4.6 |
| Etc. | After 8000 | 2.6 |

PART F

Fixation of Arsenic in Arsenic Containing Sludge Waste

Two hundred grams of the arsenic containing sludge used in Part E were treated by first mixing with 20 grams of lime (resultant pH 11), then the mixing was continued with addition of 20 grams of vermiculite and 20 grams of cement. The mixture had the appearance of a paste without a separate liquid phase. After standing for 3 days, the mixture had a dry hard appearance. A core sample of the hardened mixture was obtained by driving a tube into the mass. One hundred grams of the core sample were tested by the method described in Part A. The results of the leaching test are as follows:

| Leach Sequence | Leach Portion Volume (ml.) | Arsenic Content (ppm) of Leach Portion |
|---|---|---|
| 1 | 100 | 8.5 |
| 2 | 100 | 0.05* |
| 3 | 100 | 0.05* |
| 4 | 100 | 0.22 |
| 5 | 100 | 0.39 |
| 6 | 100 | 0.05* |
| 7 | 100 | 0.16 |
| 8 | 100 | 0.05* |

*limit of detection

PART G

Fixation of Arsenic and Mercury in Combined Sludge Waste

Two hundred grams of mixed sludge were prepared by mixing one part by weight of the mercury containing sludge described in Part B with one part by weight of the arsenic sludge described in Part D. Two hundred grams of the mixed sludge were mixed with 5 grams of vermiculite and 30 grams of cement. The mixture was mixed to a uniform paste without the appearance of a liquid phase. It was noted that some of the vermiculite migrated to the top of the mixture. The mixture had a pH of 6. Ten grams of lime were added to give a pH of 11. The mixture was allowed to set for 6 days. One hundred grams of a core sample were tested by the method of Part A. One hundred ml. aliquots of leach solution were passed through the sludge. The results are shown below:

| Leach Solution | Leach Portion (volume ml.) | Heavy Metal Content (ppm) of Leachate | |
|---|---|---|---|
| | | Hg | As |
| 1 | 100 | 0.011 | 0.97 |
| 2 | 100 | 0.003 | 0.25 |

While the invention has been described with reference to specific embodiments, it will be understood that modifications of the invention may be made without departing from the invention as described in the following claims.

What is claimed:

1. A method of treating heavy metal containing sludge waste to produce a cementitious solid product having reduced heavy metal leachability by mechanically mixing said waste with fixing ingredients comprising vermiculite and cement, said waste and fixing ingredients being mixed in a proportion effective to set as a cementitious solid product.

2. The method of claim 1 wherein the heavy metal content of the sludge waste comprises mercury or arsenic.

3. The method of claim 1 wherein the sludge waste originates from mercury cathode brine electrolysis cell operation.

4. The method of claim 1 wherein the cement is Portland cement.

5. The method of claim 1 wherein the weight ratio of vermiculite to cement is from about 5:1 to about 1:5.

6. The method of claim 1 wherein the solids content of the sludge waste is from about 40 to about 70 weight percent based on the weight of the sludge waste.

7. The method of claim 1 wherein sludge waste is mixed with cement ingredient in proportion such that the weight ratio of the aqueous liquid phase of the sludge to cement is in the range from 10:1 to 1:3.

* * * * *

UNITED STATES PATENT AND TRADEMARK OFFICE
CERTIFICATE OF CORRECTION

PATENT NO. : 4,113,504
DATED : October 3, 1977
INVENTOR(S) : Kon S. Chen and Helmut W. Majewski It is certified that error appears in the above—identified patent and that said Letters Patent are hereby corrected as shown below:

Column 6, line 36, in the Table under the heading "Leach Solution" and above the number "2"; the number --1-- is added.

Signed and Sealed this

*Twenty-third* Day of *January 1979*

[SEAL]

*Attest:*

RUTH C. MASON
*Attesting Officer*

DONALD W. BANNER
*Commissioner of Patents and Trademarks*